Patented June 28, 1932

1,864,621

UNITED STATES PATENT OFFICE

VERNON J. SPRUNGER, OF AKRON, OHIO, ASSIGNOR TO AMERICAN ANODE INCORPORATED, OF AKRON, OHIO, A CORPORATION OF DELAWARE

MANUFACTURE OF RUBBER GOODS

No Drawing. Application filed April 18, 1931. Serial No. 531,249.

This invention relates to the art of rubber manufacture, and particularly to the manufacture of rubber goods by the coagulation of an aqueous dispersion such as latex on the surface of a form.

Many rubber articles have heretofore been manufactured by coating the surface of a form with a coagulant, and then immersing it in latex, the coagulant diffusing into the latex and effecting the coagulation of a uniform layer of latex rubber on the form. Under certain operating conditions difficulties have been observed in the practice of this method, particularly the trapping of air bubbles as the coagulant-coated form is immersed in the latex, each bubble giving rise to a hole or at least a pit in the coagulated rubber coating, and the appearance of ripple markings on the rubber deposit. The chief object of this invention accordingly is to provide a method for coagulating aqueous dispersions of rubber in a smooth, uniform layer, free from holes, pits, or other like defects.

According to this invention a form upon which a rubber deposit is to be produced is coated with a suitable coagulant and is exposed for a short time to an atmosphere containing alkaline vapors before it is immersed in the rubber dispersion.

As a specific example of one manner of practicing this invention, the manufacture of heavy seamless gloves will be described. Glazed porcelain glove forms are carefully cleaned and immersed in a coagulant solution containing 500 parts by weight of calcium nitrate dissolved in 600 parts of acetone, preferably a solution which has aged for a few weeks. The forms are slowly removed from the coagulant in order to permit the excess liquid to drain off the forms, and are placed in a covered container of dilute ammonia vapor rising from a 2 to 2.5% solution of ammonia in the bottom of the container. After from 30 to 60 seconds the forms are removed from the ammonia vapor and inverted for a few seconds to promote a uniform distribution of the viscous coagulant film, and are then carefully lowered into the latex, which is preferably a concentrated vulcanizable latex containing about 60% of solid ingredients and of the consistency of a thin syrup. After a sufficient thickness of rubber has coagulated on the forms, usually from 5 to 10 minutes, the forms are removed from the latex, allowed to drain for a few seconds, and repeatedly inverted until the film of latex on the surface of the gloves has set and ceased to flow. The gloves are then washed, dried, and vulcanized on the forms in the usual, well-known manner.

The process described above has reduced the proportion of defects in rubber goods made directly from latex almost to zero.

The exact reason for the effectiveness of the treatment outlined above is not understood, but it is believed that the alkali absorbed by the coagulant affects its surface tension and the manner in which the latex wets the coagulant film.

This invention is not limited to the precise composition of coagulant alkaline vapor, or rubber dispersion described above, although the said compositions constitute a preferred embodiment of the invention. The coagulant, which may be applied to a porous or impervious form of any conventional material, may consist of any liquid acid or coagulant salt or solution of any acid or coagulant salt in water or other volatile or non-volatile solvent, but is preferably a solution of a salt of a poly-valent metal in a volatile organic solvent. The alkaline vapors may consist of any volatile base such as the volatile aliphatic amines, but ammonia is preferred because of its greater volatility and cheapness. The rubber dispersion may be any natural latex of rubber, gutta-percha or balata, or an artificial aqueous dispersion of such substances or of synthetic rubber, reclaimed rubber or rubber-like substances, whether employed alone or admixed with other dispersions of pigments, fillers, vulcanizing agents, etc.; and it is to be understood that the term "aqueous dispersion of rubber" is employed in the appended claims in a generic sense to include all such dispersions.

Although certain preferred manners of performing my invention have been disclosed, I do not desire to limit myself thereby, for, as hitherto stated, the invention is subject to numerous modifications without departing from the spirit and scope of the invention as defined in the appended claims.

I claim:

1. The method of manufacturing rubber goods which comprises coating a form with a coagulant, exposing the form to an alkaline vapor, and immersing the coated form in an aqueous dispersion of rubber.

2. The method of manufacturing rubber goods which comprises coating an impervious form with a solution of a coagulant in a volatile solvent, exposing the form to an alkaline vapor, and immersing the coated form in an aqueous dispersion of rubber.

3. The method of manufacturing rubber goods which comprises coating a form with a coagulant, exposing the form to ammonia vapor, and immersing the coated form in an aqueous dispersion of rubber.

4. The method of manufacturing rubber goods which comprises coating an impervious form with a solution of a coagulant in a volatile solvent, exposing the form to ammonia vapor, and immersing the coated form in an aqueous dispersion of rubber.

5. The method of manufacturing rubber goods which comprises coating an impervious form with a solution of a salt of a polyvalent metal, exposing the form to ammonia vapor, and immersing the coated form in an aqueous dispersion of rubber.

6. The method of manufacturing rubber goods which comprises coating an impervious form with a solution of a salt of a polyvalent metal in a volatile organic solvent, exposing the form to ammonia vapor, and immersing the coated form in an aqueous dispersion of rubber.

7. The method of manufacturing rubber goods which comprises coating an impervious form with a solution of calcium nitrate in acetone, exposing the form to ammonia vapor, and immersing the coated form in an aqueous dispersion of rubber.

In witness whereof I have hereunto set my hand this 15th day of April, 1931.

VERNON J. SPRUNGER.